United States Patent [19]
Bieth et al.

[11] 3,860,129
[45] Jan. 14, 1975

[54] APPARATUS FOR HOMOGENIZING PARTICULATE MATERIAL

[75] Inventors: André Jean Bieth; Henri Jean-Marie Jeru, both of Le Trait; Bernard Roger Pierre Bakker, Yvetot, all of France

[73] Assignee: Chantiers Navals de la Ciotat Etablissement du Trait, Seine Maritime, France

[22] Filed: June 23, 1972

[21] Appl. No.: 265,603

[52] U.S. Cl............ 214/16 R, 214/17 CB, 222/459, 222/478, 222/564
[51] Int. Cl............................................. B65g 65/32
[58] Field of Search............ 214/17 C, 17 CB, 16 R; 222/459, 564, 478

[56] References Cited
UNITED STATES PATENTS
1,820,521  8/1931  Allen............................ 214/17 R X
2,863,575  12/1958  Vasold........................... 214/17 C

*Primary Examiner*—Robert G. Sheridan
*Attorney, Agent, or Firm*—Sandoe, Hopgood & Calimafde

[57] ABSTRACT

The invention relates to apparatus for homogenizing particulate material comprising a container and feed means to feed material to the container in a series of juxtaposed layers. Discharge means are constructed to allow discharge of the material from the container in such a manner that a small fraction of each layer is continuously withdrawn from the container, the surfaces of separation between successively extracted fractions of each layer being disposed transversely of surfaces of separation between the said juxtaposed layers.

15 Claims, 24 Drawing Figures

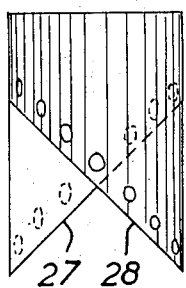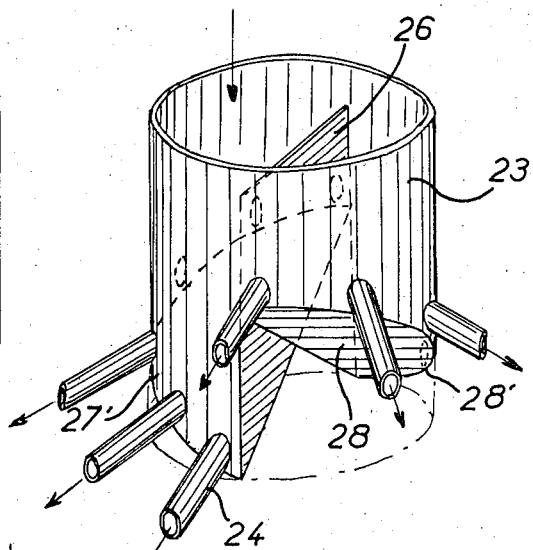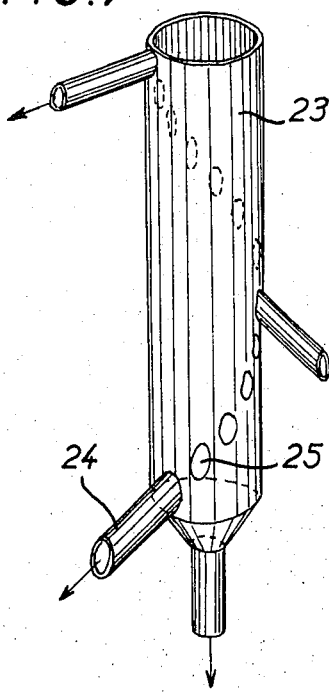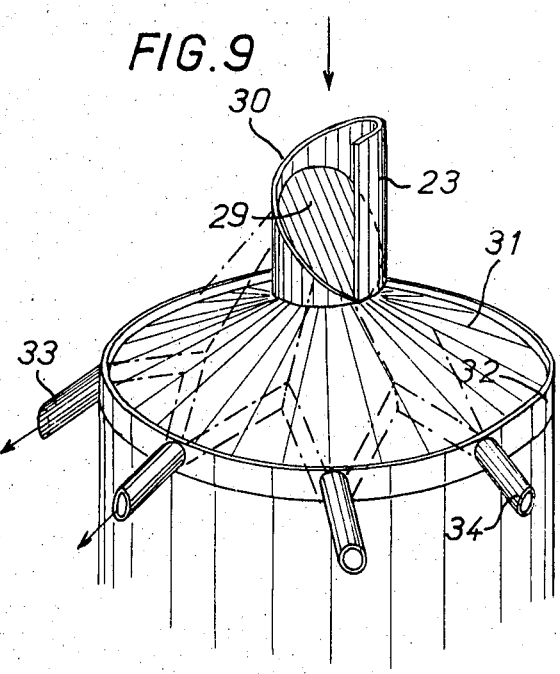

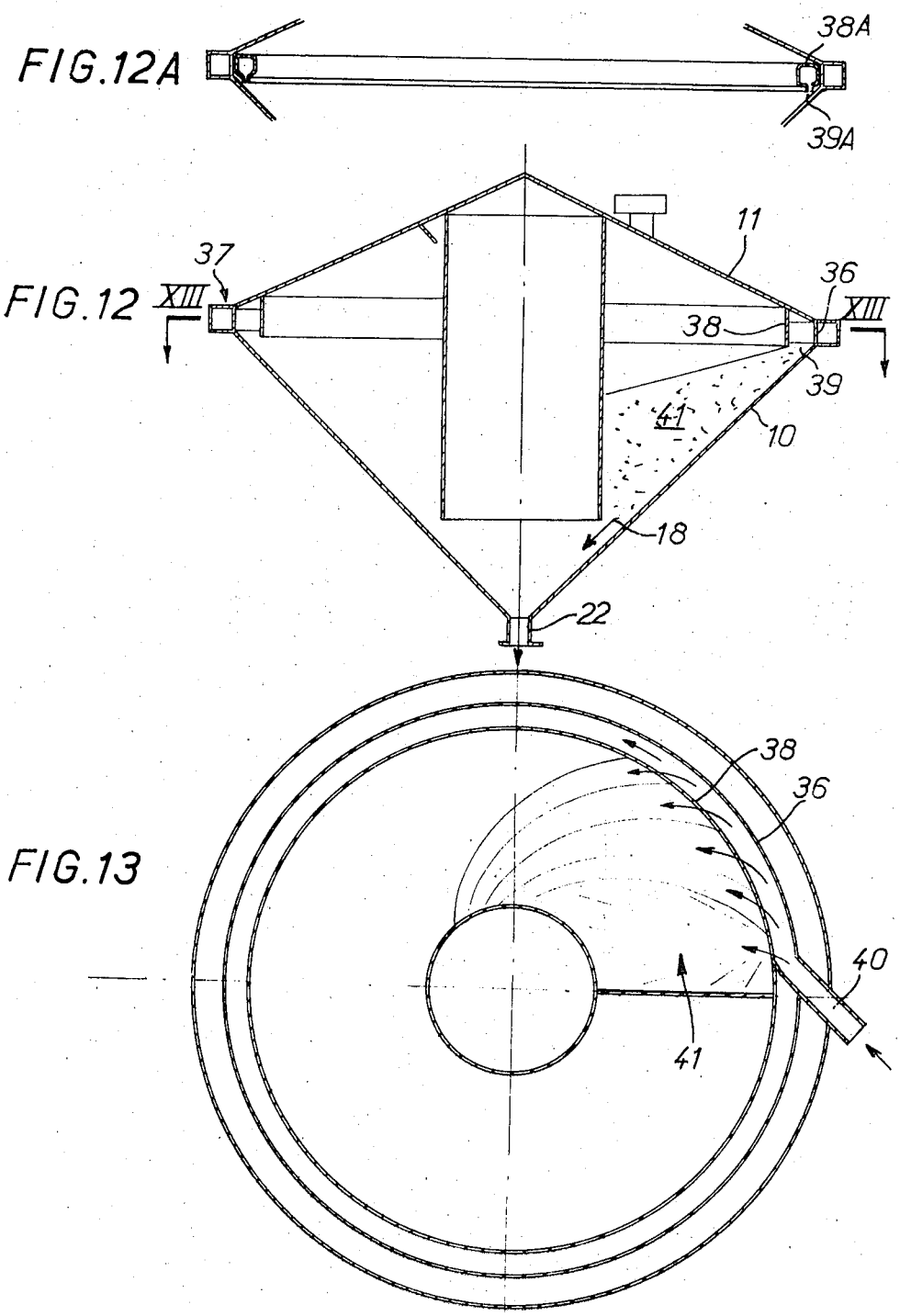

APPARATUS FOR HOMOGENIZING PARTICULATE MATERIAL

BACKGROUND OF THE INVENTION

1. Field of the Invention

This invention relates to apparatus for homogenizing particulate material.

2. Description of the Prior Art

It is well-known that the quality of particulate materials, e.g., granulated or pulverulent materials or products which are stored before use varies to a quite large extend depending, for example, upon dates of delivery and the batches in which they are delivered, or upon their geographical source. It is often necessary to render the quality of these products uniform for the purpose of conditioning or processing them.

The methods at present employed for homogenizing these products involve mixing with the aid of air jets or by gravitational movement. Thus, in one known method, the products, initially located at different levels in a generally cylindrical container, are moved by way of ducts.

The homogenization achieved in this way is based on the probability of the different layers passing in front of the openings of these ducts. The result obtained is uncertain and very often it is necessary to recycle the product. This type of apparatus is difficult to clean and there is a risk of the ducts becoming blocked.

Another previously proposed process consists in dividing the batch of material to be homogenized into smaller volumes which are placed in separate containers which are emptied simultaneously. In this case the result depends upon the homogeneity of the contents of each container and in this case too it is necessary to recycle the product or to use a very large number of containers.

The object of the present invention is to facilitate the homogenization of particulate products, to reduce the cost and size of the installations required for this purpose, and to increase the degree of uniformity finally obtained.

SUMMARY OF THE INVENTION

According to the invention there is provided apparatus for homogenizing particulate material comprising:
a container;
feed means to feed material to the container in a series of juxtaposed layers; and
discharge means constructed to allow discharge of material from the container in such a manner that a small fraction of each layer is continuously withdrawn from the container, the surfaces of separation between successively extracted fractions of each layer being disposed transversely of surfaces of separation between the said juxtaposed layers.

Several preferred feed means are hereinafter described for facilitating the formation of juxtaposed layers in the container; also preferred discharge means are described.

The invention also extends to a silo including such apparatus for homogenizing particulate material.

The objects, features and advantages of the invention will be seen from the following description relating to a number of ways of putting the invention into set, selected by way of example, and illustrated in the accompanying drawings.

BRIEF DESCRIPTION OF THE DRAWINGS

FIGS. 7, 8, 8A and 9 illustrate various feed means;

FIGS. 12 and 12A are concerned with a frusto-conical homogenizing container fitted with pneumatic feed means;

FIG. 13 is a section on the line XIII—XIII of FIG. 12;

DESCRIPTION OF THE PREFERRED EMBODIMENT

Figure 2:
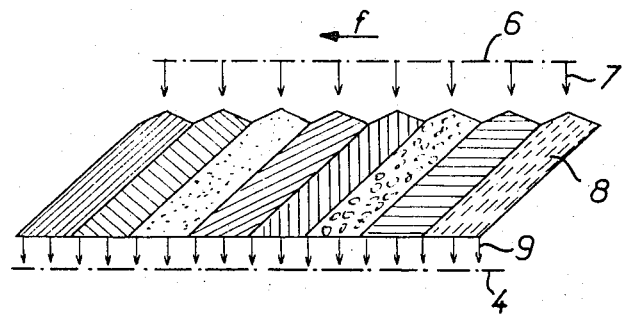
FIG. 2 is a diagrammatic longitudinal section through the material stored in this container.
Figure 3:
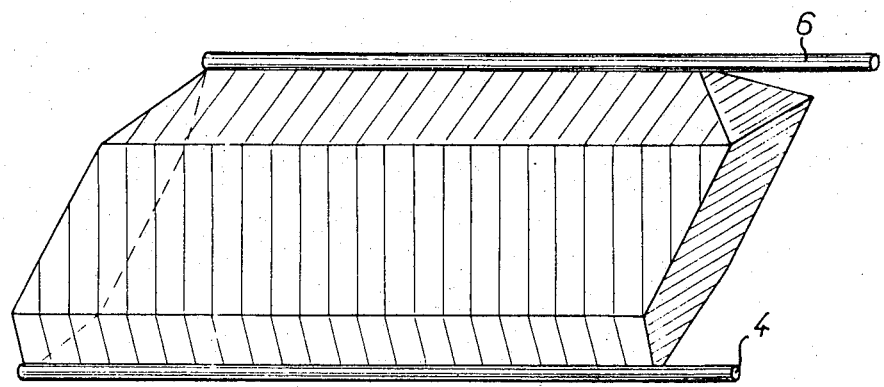
FIG. 3 is a diagrammatic perspective view of the mass of material stored in this container.
Figure 1:
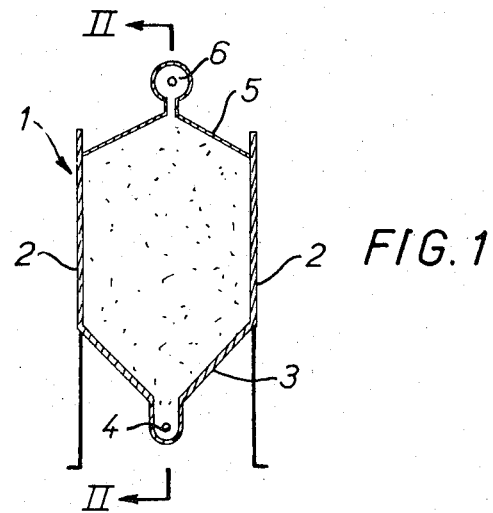
FIG. 1 is a cross-section through a storage container forming part of apparatus in accordance with the invention.

In the form of construction illustrated in FIGS. 1 to 3, a container or silo 1 has two elongated vertical walls 2 braced at each end of the silo by an inclined wall, not illustrated. The two bracing walls are parallel with each other, and their angle of inclination is preferably equal to the angle of repose of the material that it is required to homogenize. The silo is completed by a base 3 in the form of a hopper fitted with a longitudinal discharge means 4, and by a cover 5 with which is associated a feed or distributor means 6. Like the discharge means 4, the distributor 6 extends over the entire length of the silo and has a plurality of inlet pipes. It comprises an Archimedean screw in which the product moves in the direction of the arrow $f$ (FIG. 2), and the inlet pipes 7, disposed at regular intervals along the casing of this screw, each form a layer 8 of material inside the silo. These pipes may each be replaced by a slot extending along the lower generatrix of the screw, and this results in thin layers 8. When each of the layers 8 reaches the top, the corresponding pipe is blocked and the next pipe begins to discharge material to form a new layer juxtaposed to the preceding one.

For emptying purposes, the discharge means 4 has discharge pipes 9 which open simultaneously, or more simply, the discharge means is equipped with a screw of increasing pitch. Consequently, a sample of material withdrawn will contain fractions from all of the juxtaposed layers.

Figure 4:
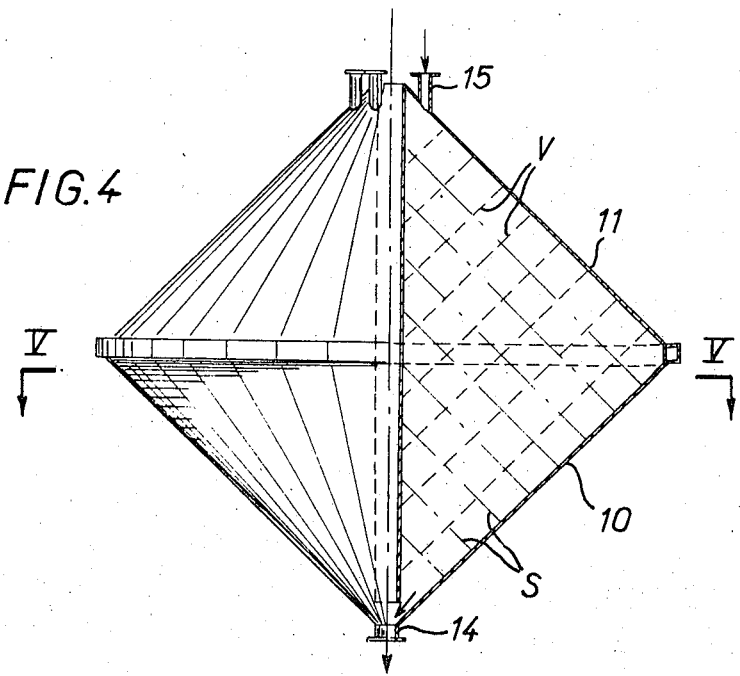
FIG. 4 illustrates, partly in elevation and partly in section, another homogenizing apparatus in accordance with the invention.
Figure 5:
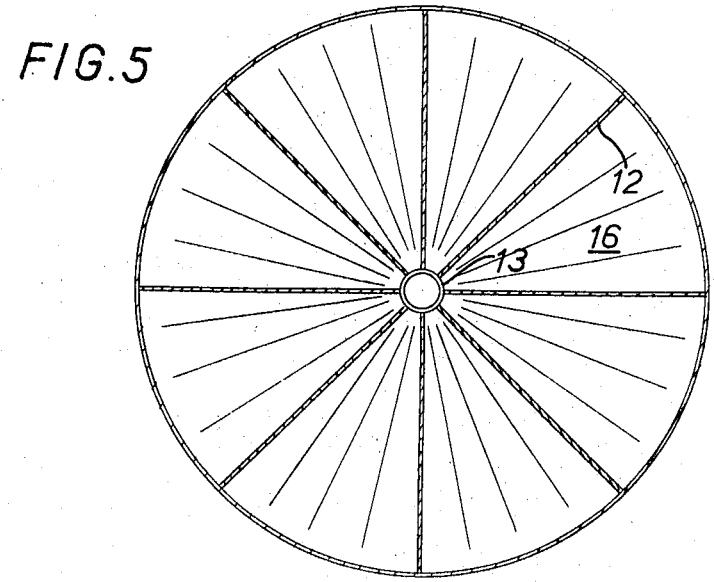
FIG. 5 is a section on the line V—V of FIG. 4.

Referring to FIGS. 4 and 5, a homogenizing container comprises a downwardly tapering conical portion 10, surmounted by an upwardly tapering conical portion 11. These two conical portions, which could instead be frusto-conical, are interconnected along the peripheries of their larger ends to form a closed container which is divided into eight compartments by radial partitions 12. These partitions extend from a central post or stack 13 which may consist for example of a tube of standard cross-section. The post 13 terminates at a short distance above the lower end of the conical portion 10 where a discharge pipe 14 is fitted, an annular discharge gap being formed between the base of the post and the inner surface of the cone. The pipe 14 and annular gap form discharge means for the container. Feed means in the form of pipes each having an inlet port for feeding a compartment 16, are fitted at the top of the conical portion 11 in the immediate vicinity of the post 13.

During filling, the compartments 16 are successively charged and receive superposed, juxtaposed layers of material which are deposited to lie at an angle corresponding to the natural angle of repose of the material. Since the inlet pipes 15 are located centrally, the stored layers slope downwardly from the central post 13 in the direction of the lines S.

During emptying, which occurs simultaneously from all the compartments through the discharge pipe 14, a segment of a cone of material slides from each compartment and converges towards the central post 13, the apex of the complete cone formed by all the segments being positioned vertically above the discharge pipe, so that the material tends to be discharged in successive layers which slope downwardly from the wall 11 towards the centre in the direction of the lines V. The stored material is thus discharged in successive fractions separated from each other by surfaces extending transversely in relation to the direction of the stored layers. This manner of discharging in combination with the separation of the batch to be homogenized into compartments 16, enables the number of these compartments to be considerably reduced whilst still obtaining satisfactory homogenization.

In an advantageous form of the apparatus, the angles of slope of the conical portions 10 and 11 are equal to that of the angle of repose of the stored material.

Figure 6:
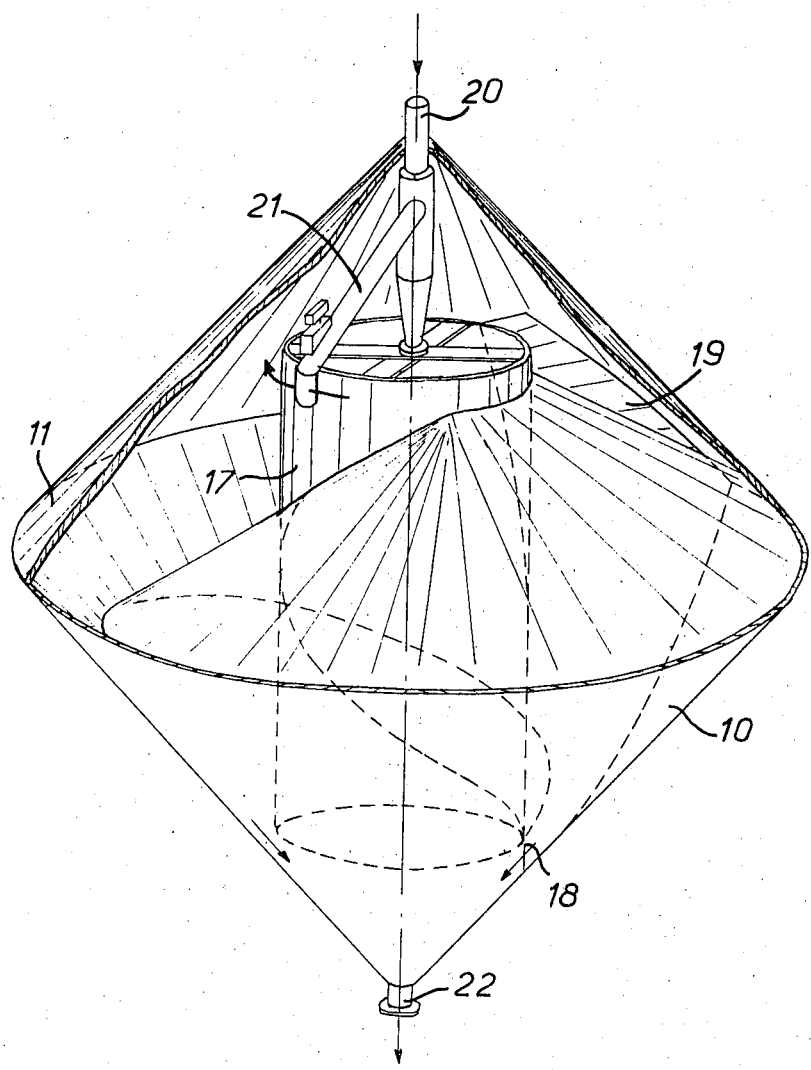
FIG. 6 shows a variant of the apparatus of FIG. 4.

The container illustrated in FIG. 6, the exterior form of which is similar to that shown in FIG. 4, also comprises two conical portions 10 and 11.

Inside this container is fitted a central stack 17 which terminates at a certain distance above the inner face of the conical portion 10, an annular gap 18 being thus formed between the inner face of the conical portion 10 and the lower edge of the stack 17.

A spiral partition 19 of cone shape is located in the gap between the stack 17 and the inside walls of the two cones forming the container. An inlet 20 for the material located at the apex enables the material to be passed to inlet means in the form of a rotary distributor pipe 21 terminating in an inlet port adapted to pass the material along the vertical wall of the stack 17 at successive points distributed around the contour of this wall; a discharge pipe 22 is fitted at the base of the container.

The rotary distributor 21 is constructed to deposit the first layer of material admitted at 20 against the partition 19. When the apex of this layer reaches the level of the distributor 21, the latter is displaced slightly to deposit a fresh layer which is superposed upon the first, this process being repeated. The material is then discharged through the outlet pipe 22 via the annular gap 18 so that fractions of all the interposed layers are simultaneously drawn off as hereinbefore explained.

The rotary distributor 21 may be replaced by a stationary distributor such as that illustrated in FIG. 7. This distributor comprises an inlet pipe 23 to which is connected a plurality of take-off pipes 24 terminating in inlet ports. These pipes 24 extend through the wall of the pipe 23 by holes 25 spaced from each other along a helical line. These take-off pipes operate in a manner similar to that of the pipes 7 used in arrangement shown in FIG. 2. As soon as the layer formed by one of the take-off pipes 24 reaches the top, this pipe fills, and the next take-off pipe then comes into operation on the overfill principle.

The feed means shown in FIGS. 8 and 8A is a variant of that seen in FIG. 7. It includes a central inlet pipe 23 and take-off pipes 24 terminating in inlet ports. However, in contrast to the previously described arrangement, the pipe 23 has an interior vertical partition 26. Each of the two compartments thus formed is closed by an inclined base. These two bases 27 and 28 are inclined in opposite directions, the line of greater slope of each of them being parallel with the plane of the partition 26. The lines along which the two bases 27 and 28 intersect the corresponding half-walls of the pipe 23 are two semi-elipses 27' and 28' respectively, the planes of the bases 27 and 28 intercepting substantially at right angles as best seen in FIG. 8A which the uppermost point of each base is substantially above the lowermost point of the other base. The pipes 24 pass through a number of holes in the wall of the pipe 23 located along two lines each extending over one half of a turn of a helix.

Referring to FIG. 8, the material to be stored passes into the left-hand half-compartment, and the take-off pipes of the left-hand half begin to operate one after the other. When the topmost take-off pipe of this half is blocked, material that continues to arrive spills over the partition 26 and passes into the right-hand compartment to bring the second row of take-off pipes, associated with this compartment, into action. In this apparatus, without changing the number of take-off pipes, the height of the feed means can be halved as compared with that required by the arrangement shown in FIG. 7.

FIG. 9 illustrates another variant of the feed means of FIG. 7. Herein, the pipe 23 is blocked by an inclined base 29 and terminates at the top in a helicoidal edge 30 forming a pouring means which replaces the successive take-off pipes 24 and which operates in the manner of a line of imaginary take-off pipes, the space between which is infinitely small. The pipe 23 is located at the top of a frusto-conical wall 31 which constitutes a chute and which terminates in a vertical upwardly projecting edge 32, through which pass take-off pipes 33 which are spaced at regular intervals around said vertical edge for allowing the material into the container.

The whole of this arrangement rests on a cylindrical supporting wall 34. The material admitted through the pipe 23 first spills along the helicoidal edge 30 to the lowest point thereof and then flows over the frusto-conical surface 31 and passes through the take-off pipe 33 located opposite this lowest point of the pouring edge, so as to form a first layer of the product. When this layer is formed, the pipe 33 is filled and the corre- ...one of the pouring device is blocked. The ...al, continuing to reach the inclined base 29, ...urs progressively over the zones of the pouring device which are located one above the other along the helicoidal edge and which supply a further take-off pipe 33 each time, so as to deposit the material in superposed layers in the container of the homogenizer located below the distributor means. This feed means may operate without the projecting edge 32 and the take-off pipes 33. The material then simply pours along the lower edge of the conical portion 31 and into the container of the homogenizer below, the latter not being illustrated in the drawing.

Figure 10:
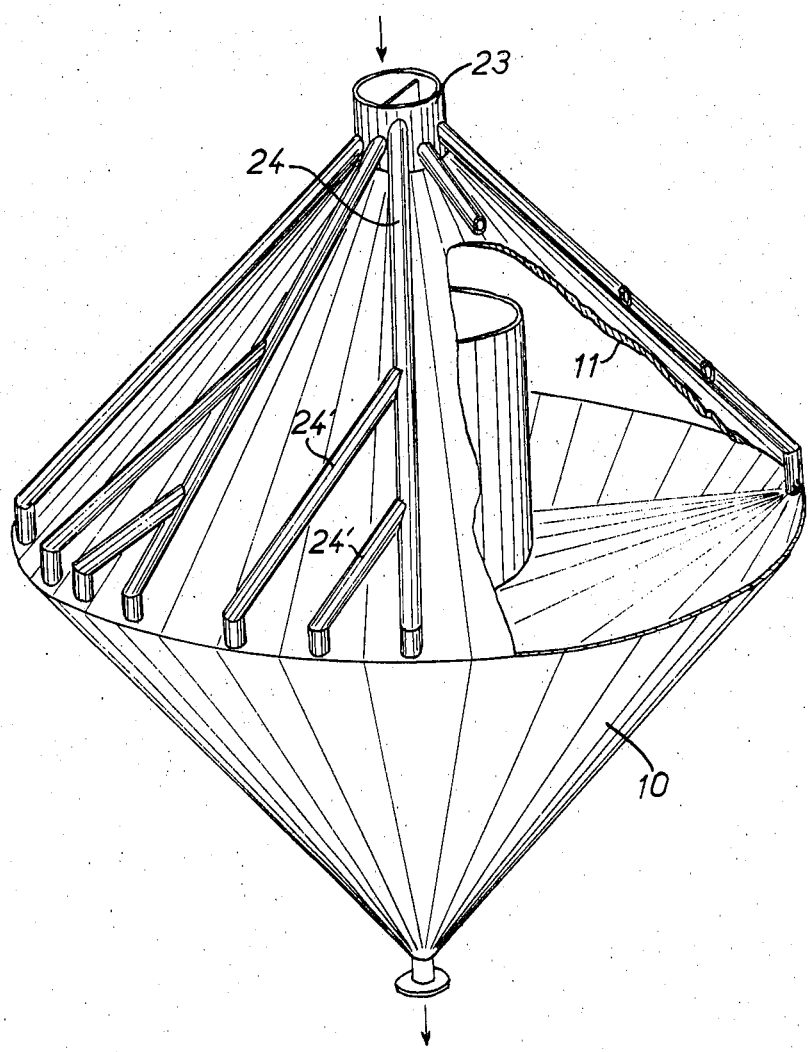
FIGS. 10 and 11 relate to feed means associated with homogenizing containers of frusto-conical shape.

A homogenizing container, consisting of two conical portions, seen in FIG. 10, in which these two portions are designated by the numerals 10 and 11, has at its top a distributor 23 of the kind illustrated in FIG. 8. In this particular arrangement, the take-off pipes are extended and have branch pipes 24' and the outlet points of the branched assemblies are uniformly distributed over the interior of the container in the immediate vicinity of the circle along which the two conical portions 10 and 11 are connected. This apparatus enables the material to be spread in successively superposed layers over a larger perimeter than in the case of the arrangement seen in FIG. 6, so that better homogenization is achieved.

Figure 11:
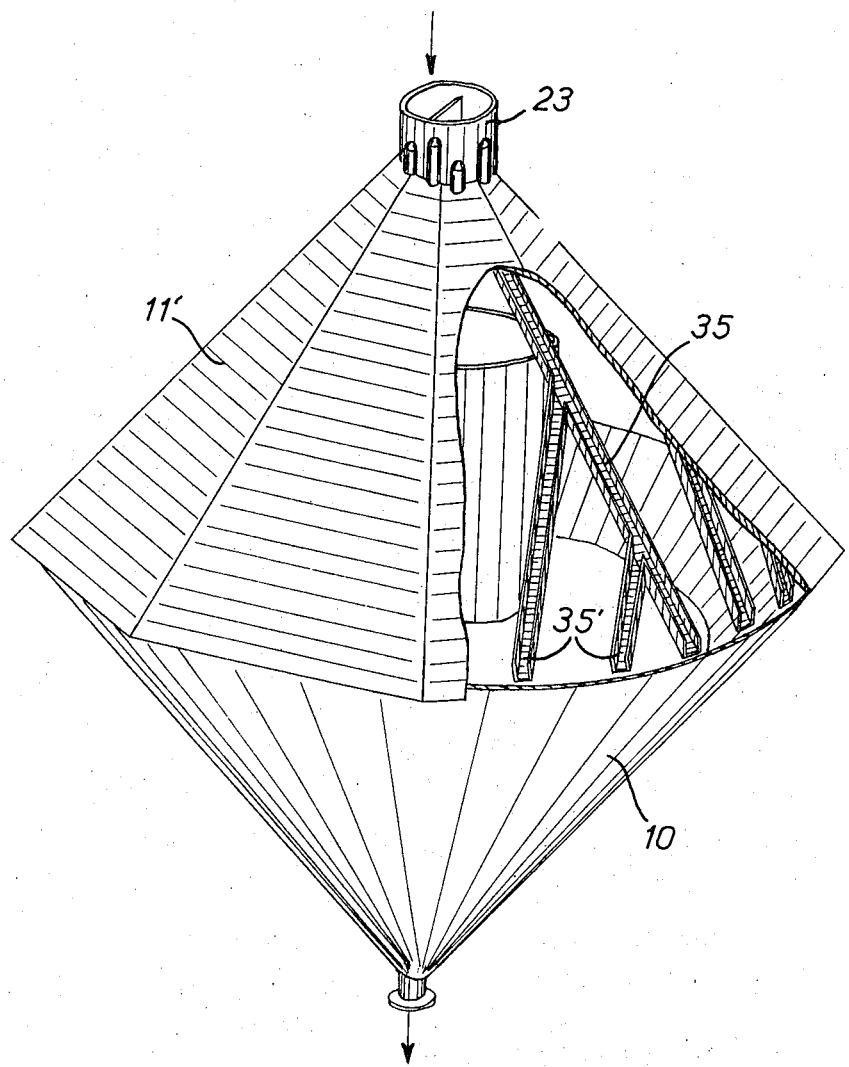

FIG. 11 illustrated a variant of the arrangement shown in FIG. 10. In the variant shown in FIG. 11, the homogenizing container is constituted by a lower conical portion 10 and a cover portion 11' of pyramidal form, at the top of which is located a pipe 23 similar to that previously described. The discharge pipes 24 of the arrangement previously described are here replaced by main channels 35 extending from ports of the distributor pipe 23 from which branch secondary channels 35'. The latter start at points spaced along the main channel 25, and like each main channel, they terminate at points distributed along the upper edge of the conical portion 10.

This feed or distributing means operates in the same way as the one previously described, except that each branched assembly continues to deliver material even after the end discharge points are blocked, since when these outlet points are blocked the material pours over the longitudinal edges of the channels and this enables the entire space defined by the container parts 10 and 11' to be filled in practice, and not merely the lower half of this space.

FIGS. 12, 12A and 13 show apparatus for forming superposed layers by means of pressurized fluid feed means, e.g., compressed air feed means.

In the container of this apparatus, two conical portions 10 and 11, similar to those previously described, are interconnected by a cylindrical wall 36 of small depth which constitutes an element of a tubular stiffening member of annular shape. Another cylindrical wall 38 depending from the inner face of the conical portion 11 and situated close to the wall 36 forms, with the latter, a distributing slot or opening 39 which extends around the container. A compressed-air duct 40 delivers the material to be homogenized into the space between the two partitions 36 and 38. When the material reaches the interior of the container, it is caused to flow by the sudden release of a blast of compressed air, and forms a heap 41.

The progressive rise in the level of the material heaped in this way has the effect of blocking part of the slot 39, and the material, continuing to arrive as a result of the action of the pressure, flows into the container through a zone immediately adjacent the blocked zone. The material thus piles up in successive layers in the lower half of the container.

Emptying of the container is accomplished in the same way as in the case of the arrangement shown in FIG. 6, i.e., by means of an annular discharge passage 18 and a lower discharge port 22.

In the variant shown in FIG. 12A, the rigid annular distributor formed by the sheet-metal plates 36 and 38 and the cover 11 is replaced by an annular duct 38A made of resilient material, for example rubber, which duct has a continuous slit 39A. When no pressure is applied, this slit is closed, so that the material, delivered pneumatically through the duct 40, is able to fill the whole of the annular duct 38A. When this duct is full, the effect of the air pressure is to force the two edges or lips of the slit 39A apart over a predetermined zone, and a heap of particulate material forms opposite this zone. When the level of this heap rises to the zone where the slit 39A opens, the latter is blocked, and the pressure opens a following zone.

Figure 14:
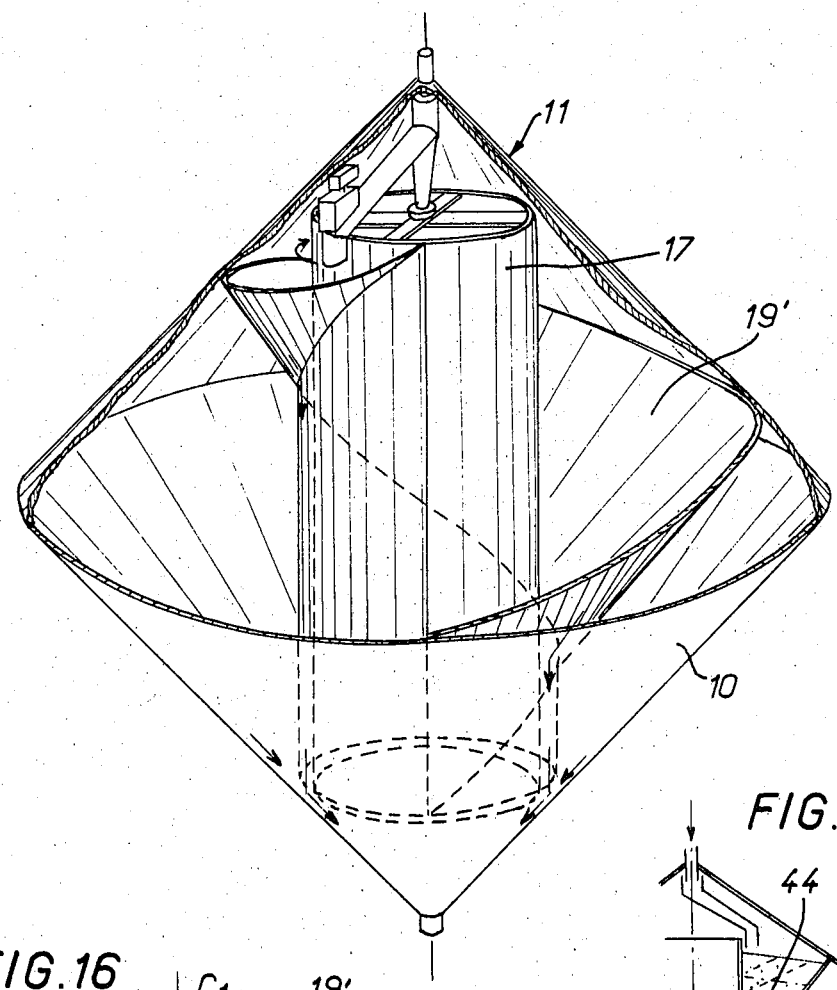
FIG. 14 is a perspective view of another frusto-conical container constructed in accordance with the invention.
Figure 16:
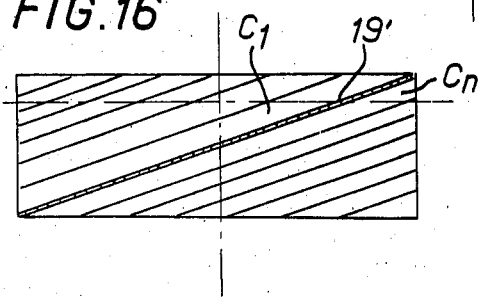
FIG. 16 is a diagrammatic developed view of the superposed layers formed inside this apparatus.
Figure 15:
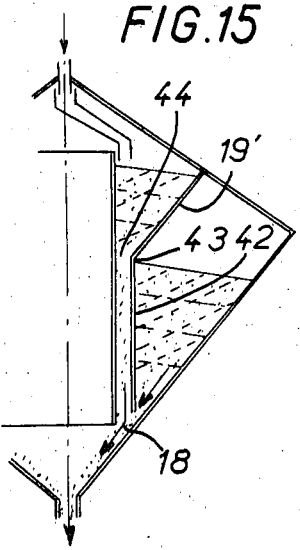
FIG. 15 shows, on a different scale, a vertical section through part of this apparatus.

FIGS. 14, 15 and 16 relate to a variant of the arrangement shown in FIG. 6. In this variant, the partition 19 is replaced by a partition 19' which is of helicoidal form and the slope of which, where it intersects the cylinder 17, is approximately the same as the angle of repose of the material that is to be homogenized.

This enables material to be stored in successive parallel layers immediately upon commencement of the filling operation. The first of these layers C1 (FIG. 16) forms on the upper face of the partition 19' and the last layer Cn is in contact with the lower face of this partition.

A cylindrical wall 42, surrounding the stack 17 and situated at a short distance therefrom, terminates in an upper edge 43 of helicoidal form and is connected to the lower face of the partition 19' along this edge. The partition 19' forms a downfeed duct 44 between the edge 43 and the stack 17. This slot enables material stored above the partition 19' to be discharged through the annular passage 18 similar to that described by reference to FIG. 6, prior to evacuation of the material stored below the partition 19', and this leads to better homogenization of the stored material during the entire period over which the emptying operation takes place.

Figure 17:
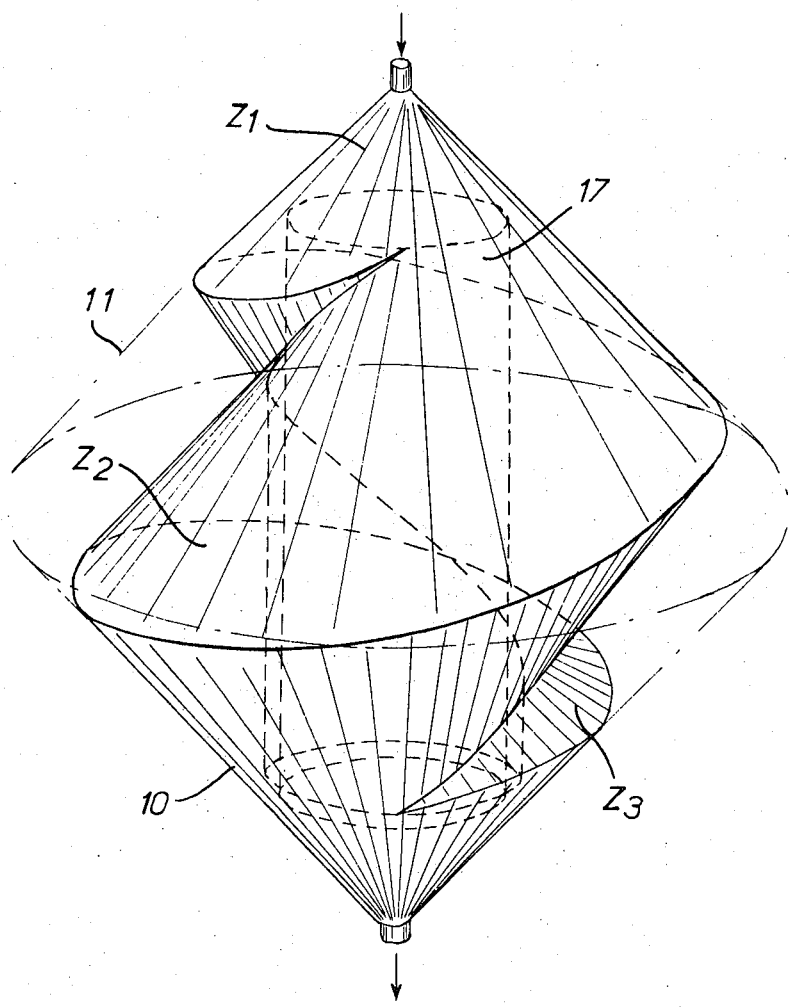
FIG. 17 shows a variant of the equipment of FIG. 14.

FIG. 17 relates to a variant of the construction of the apparatus shown in FIG. 14.

In this variant, the conical cover 11 is only present in a zone Z1, the lower edge of which coincides with the outer edge of the helicoidal partition.

The rest of the container is replaced by zones such as Z2 and Z3, the upward and inward slope of which is approximately equal to the angle of repose of the material deposited around the stack 17. The area of metal sheet required in this apparatus is less than that necessary for forming two complete conical portions 10 and 11 as illustrated in FIG. 14. In particular, this variant enables certain parts to be dispensed with, both in the lower conical portion 10 and the upper conical portion 11, the upper edge of the conical portion 10 coinciding with the outer edge of the helicoidal partition.

Figure 18:
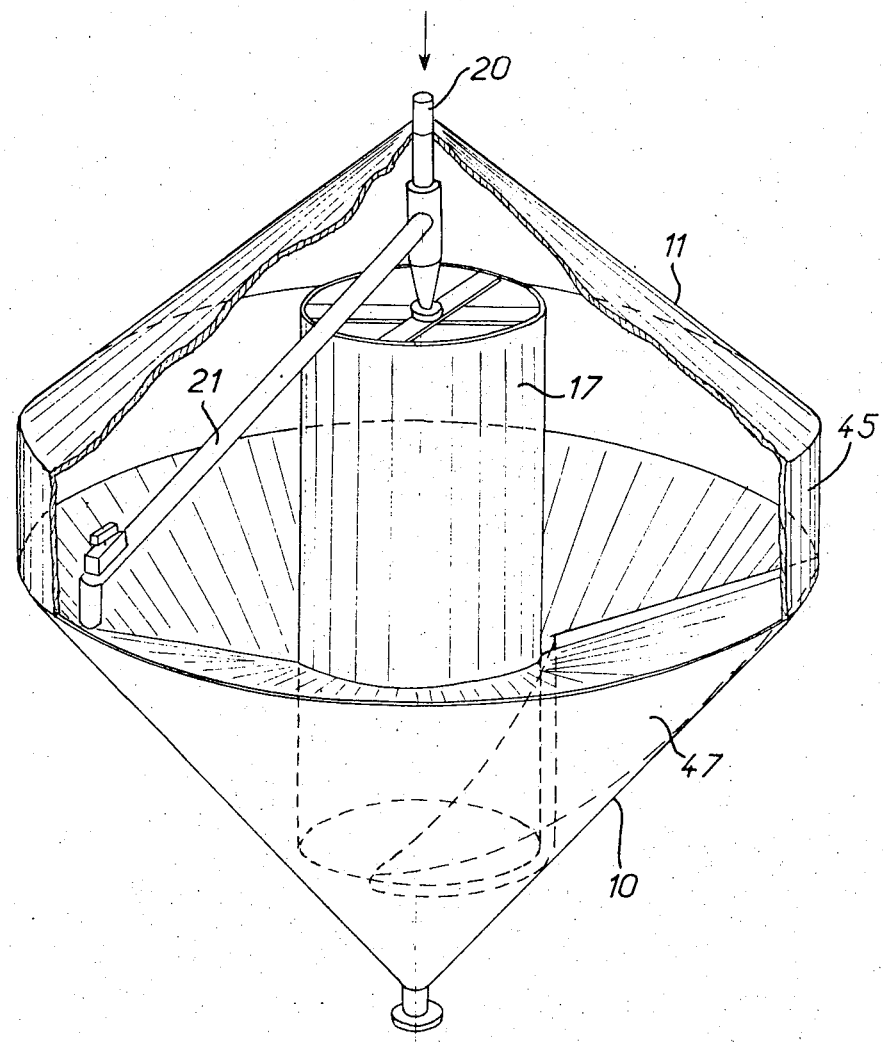
FIG. 18 relates to another variant of this same apparatus.

FIG. 18 relates to a variant in the form of two cones and comprising a lower conical portion 10 and an upper conical portion 11 interconnected by a vertical cylindrical wall 45. In this apparatus, the rotary distributor 21 delivers material along the circle of the base of the lower conical portion 10. The cavity bounded by the latter contains one or more partitions 47 inclined from the vertical. The angle of inclination of these partitions is preferably approximately the same as the angle of repose of the material to be stored. These partitions may be planar, conical, or of some other form.

Figure 19:
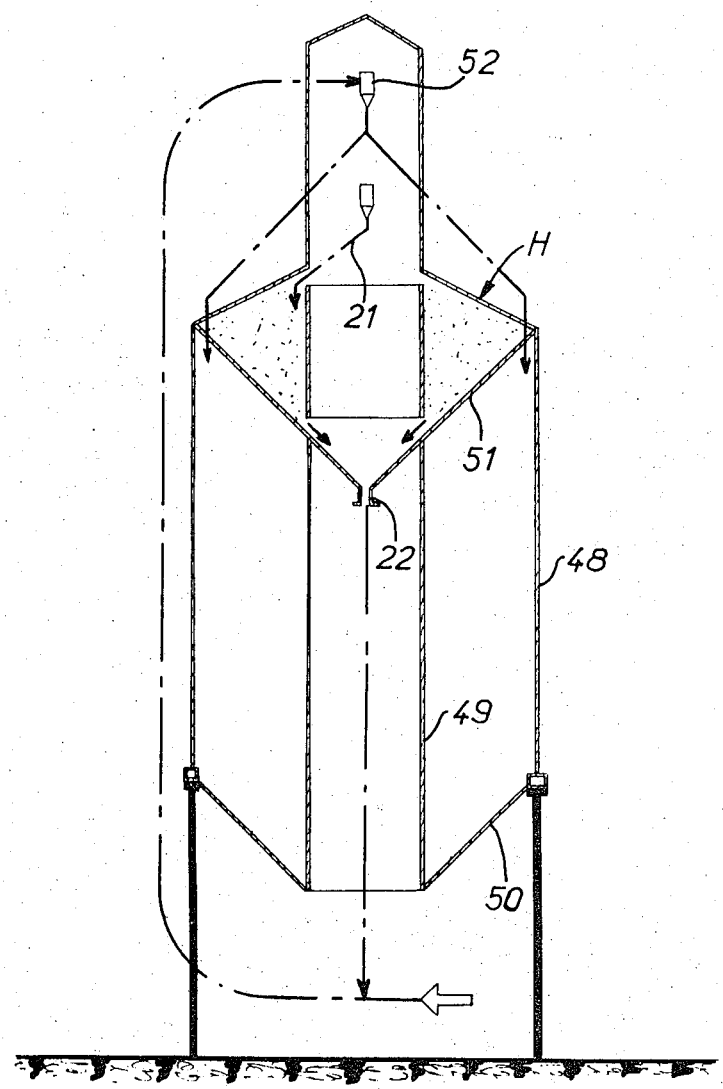
FIGS. 19 to 22 illustrate storage silos fitted with homogenizing apparatus in accordance with the invention.

Most of the homogenizing apparatuses that have been described have containers which are bodies of revolution having a vertical axis. These apparatuses are particularly suitable for use in vertical cylindrical silos which may be optionally divided into compartments by radial partitions of planar or helicoidal form. Such uses are illustrated diagrammatically in FIGS. 19 to 22. Referring to FIG. 19, a cylindrical silo has an outer cylindrical casing 48 and an inner stack 49, the annular space between these two parts being closed at the bottom by a frusto-conical partition 30, tapering downwards, and at the top by a conical partition 51 which also tapers downwards and forms part of a homogenizing container comprising two conical portions of the kind hereinbefore described.

The homogenizing container designated by the letter H will not be described in detail. It is fed by feed means 21, and the homogenized material discharged through the lower pipe 22 positioned inside the stack 49 is received on a vertical conveyor which carries it to a distributor 52, from which it falls into the storage compartments of the silo, i.e., into the spaces bounded by the elements 48, 49, 50 and 51.

Figure 20:
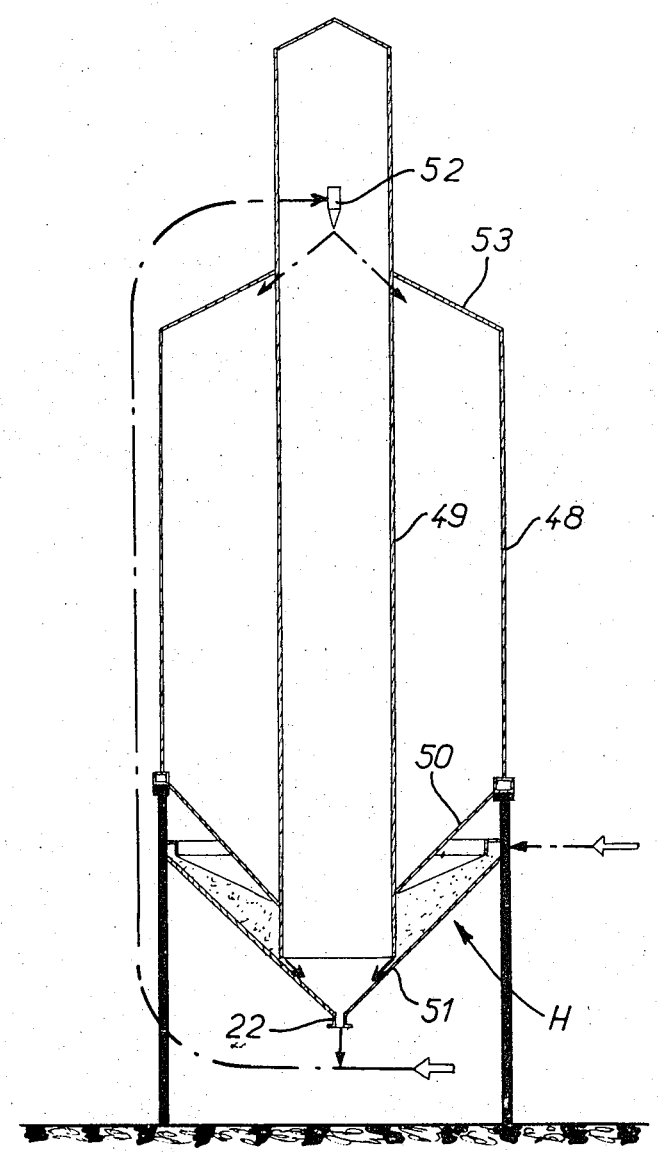

The silo seen in FIG. 20 comprises the same elements 48, 49 and 50 as those seen in FIG. 19, as well as a cover 53 of standard frusto-conical form.

A homogenizing container H comprises a downwardly tapering conical wall 51 located below the base 50 of the silo. At the bottom the stack 49 extends into the space defined by the conical portion 51 and the conical base 50, and terminates a short distance above the inner face of the conical portion 51, forming with the latter an annular discharge slot similar to the annular gap 18 shown in the arrangements illustrated in FIGS. 6 and 12. Advantageously the container H may be fitted with a pressurized fluid feed system of the kind described by reference to FIG. 12. The homogenized material delivered through the lower outlet 22 rises towards the distributor 52 and then drops into the storage containers proper.

Figure 21:
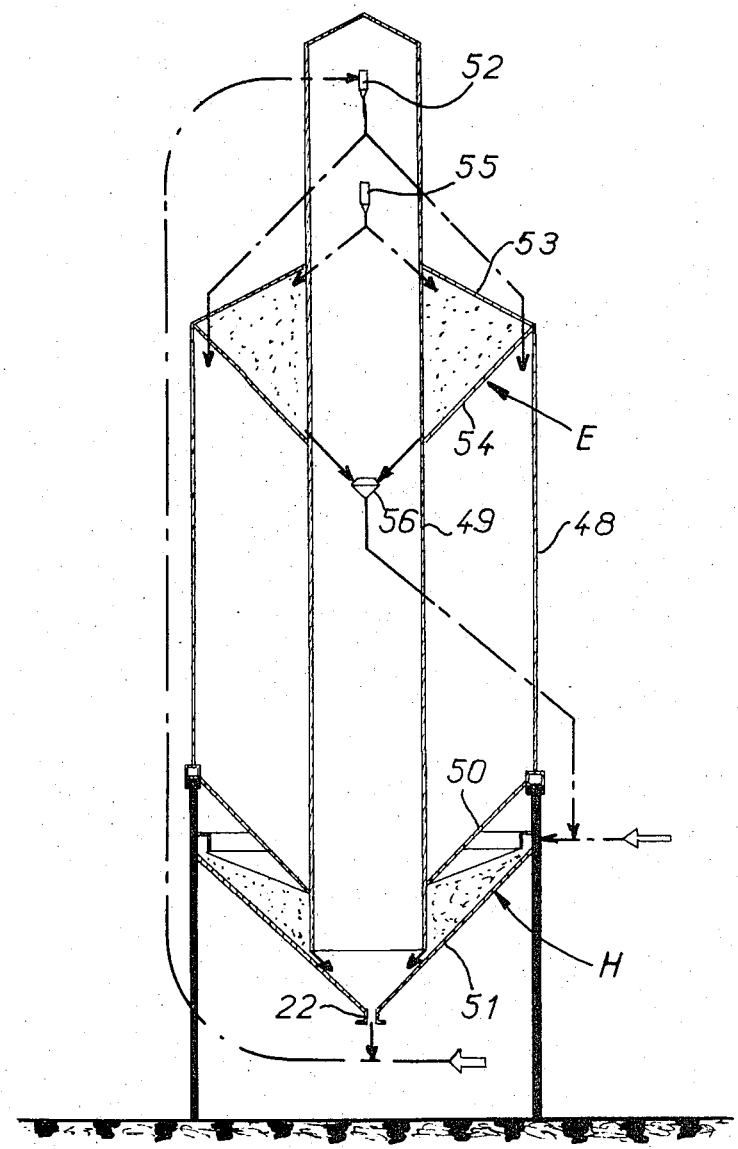

The silo shown in FIG. 21 is provided with a homogenization apparatus H similar to that seen in FIG. 20. Additionally, it comprises at its top a sampling container E constituted by an axially symmetric receptacle which may be divided into compartments and which is bounded by the frusto-conical cover 53 and a frusto-conical base 54 fitted between the outer casing 48 and the inner stack 49. A distributor 55 passes material to the sampling container E, and the material emerging from this container at 56 travels downwards to feed the homogenizing container H.

Figure 22:
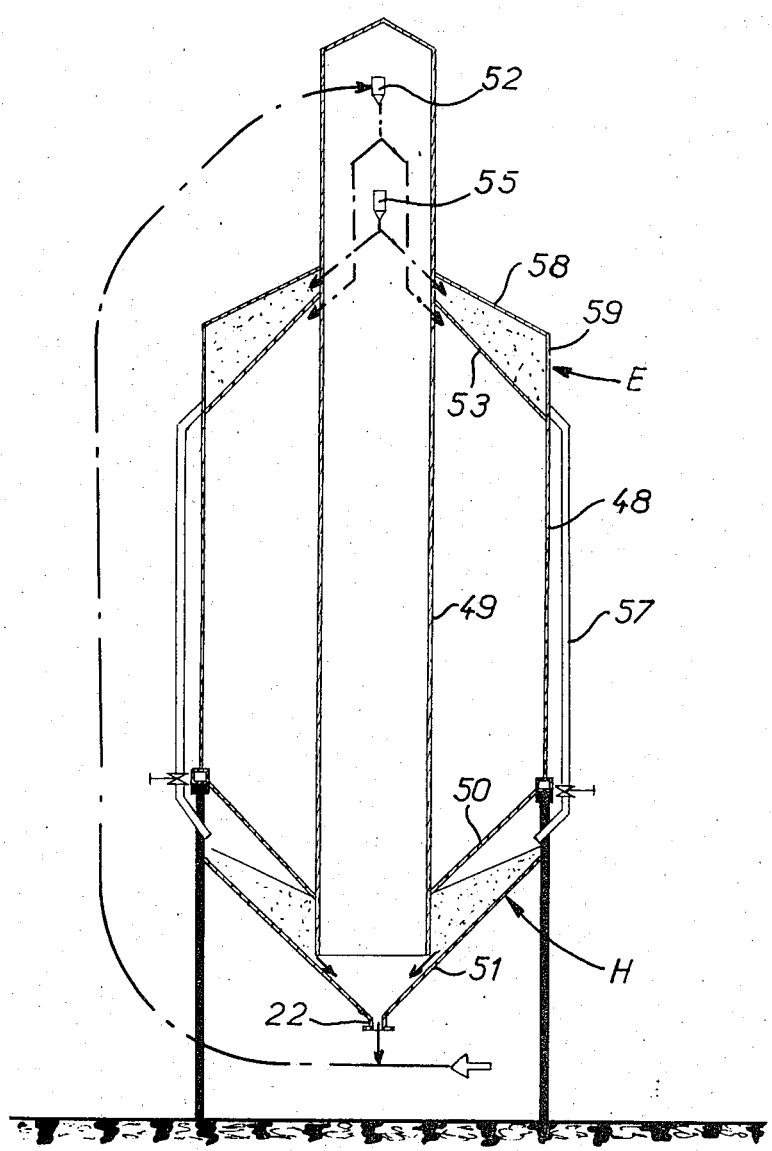

The silo illustrated in FIG. 22 comprises a homogenizing container H similar to that seen in the two previous Figures of the drawings, but fed from a sampling container E, not by pressurized fluid means in this case, but through vertical pipes 57 distributed around the periphery of the silo. The container E is axially symmetrical and is positioned above the cover 53 and is bounded thereby and by a frusto-conical top cover 58 and a cylindrical wall 53 which constitutes an upward extension of the wall 48 of the silo proper. The material contained in the sampling container E drops into the homogenizer H through the vertical pipes 58 which are controlled by valves which are opened successively, by hand or automatically, using a known system, for the purpose of feeding the material to be homogenized in superposed layers in the container H.

We claim:

1. Apparatus for homogenizing particulate material comprising:

a container having a top and bottom, feed means to feed material to the container through the top thereof in a series of juxtaposed layers corresponding to the natural angle of repose of said layers, which naturally reposed layers extend throughout said container to the bottom thereof, and discharge means comprising outlet means which communicates with each of said layers at the bottom of said container when said container is filled to capacity, such that a small fraction of each layer is continuously and simultaneously withdrawn from the container, the surfaces of separation between successively extracted fractions of each layer being disposed transversely of surfaces of separation between the said juxtaposed layers.

2. Apparatus according to claim 1 in which the container is defined by two vertical longitudinal walls connected at their ends by two substantially parallel inclined walls, the angle of inclination of the said inclined walls being chosen having regard to the natural angle of repose of the particulate material to be homogenized.

3. Apparatus according to claim 2 in which the feed means includes ports arranged over the entire length of an upper portion of the container.

4. Apparatus according to claim 1 in which the container includes an inverted conical or frusto-conical base the axis of which is substantially vertically arranged.

5. Apparatus according to claim 4 in which a coaxial stack is located inside the container and extends from the top of the container to a short distance above the bottom of the container, in which the feed means includes inlet port means arranged to feed said material around the stack, and in which the discharge means includes an annular gap formed between the lower edge of the stack and the base of the container.

6. Apparatus according to claim 5 in which a partition is disposed between the stack and the inner wall of the container, is inclined towards the stack, and has at least one opening for discharging material from above the partition communicating with a downfeed duct terminating near the said annular gap.

7. Apparatus according to claim 6 in which the partition is of helicoidal form.

8. Apparatus according to claim 7 including a conically shaped cover, in which the base is bounded by an upper edge which follows a line along which the base cone meets the helicoidal partition, and in which the cover is bounded by a lower edge which follows a line along which the cover cone meets the helicoidal partition.

9. Apparatus according to claim 5 in which at least one partition is located in the container.

10. Apparatus according to claim 4 in which the feed means comprises a pipe coaxial with the container and having helically disposed inlet ports therein.

11. Apparatus according to claim 10 in which the ports each communicate with corresponding branches of said apparatus, the outlet points of the branches being angularly spaced from each other within the container.

12. Apparatus according to claim 4 in which the feed means comprises a pipe mounted transverse to and rotatable about the axis of the container.

13. Apparatus according to claim 4 in which the feed means comprises:
- an inlet pipe coaxial with the container;
- a partition dividing the pipe into two compartments, the upper edge of the partition being located below the top of the pipe;
- an inclined base plate closing the lower end of each compartment and arranged so that the plane of intersection of each base plate with the corresponding wall portion of the pipe is inclined with the uppermost point of each base plate located substantially vertically above the lowermost point of the other base plate; and
- a row of ports disposed in each wall portion adjacent to and above the respective line of intersection.

14. Apparatus according to claim 13 in which the ports each communicate with corresponding branches of said apparatus, the outlet points of the branches being angularly spaced from each other within the container.

15. Apparatus according to claim 4 in which the feed means comprises:
- an inlet pipe closed by an inclined base plate and having a helical upper edge adapted to form overflow means for the material;
- a frusto-conical surface surmounted by the inlet pipe and sloping downwardly and outwardly therefrom adapted to receive the overflowed material;
- an upstanding edge portion around the lower periphery of the frusto-conical surface; and
- discharge points disposed around said edge portion for allowing material into the container.

* * * * *